United States Patent [19]

Tarbox et al.

[11] Patent Number: 4,842,403
[45] Date of Patent: Jun. 27, 1989

[54] SENSING STRAIN AND TEMPERATURE

[75] Inventors: Eleanor J. Tarbox, West End; Paul L. Scrivener, Shirley, both of United Kingdom

[73] Assignee: Pirelli General plc, United Kingdom

[21] Appl. No.: 281,963

[22] Filed: Dec. 5, 1988

Related U.S. Application Data

[63] Continuation of Ser. No. 61,734, Jun. 11, 1987, abandoned.

[30] Foreign Application Priority Data

Jun. 19, 1986 [GB] United Kingdom ............... 8614960

[51] Int. Cl.$^4$ .......................... G01B 11/16; G01J 5/38
[52] U.S. Cl. ....................................... 356/73; 73/800; 356/32; 374/161
[58] Field of Search .................... 356/32, 43, 73; 374/161, 162; 73/800

[56] References Cited

U.S. PATENT DOCUMENTS

| | | | |
|---|---|---|---|
| 4,151,747 | 5/1979 | Gottlieb et al. | 356/43 |
| 4,295,738 | 10/1981 | Meltz et al. | 356/32 |
| 4,295,739 | 10/1981 | Meltz et al. | 356/32 |
| 4,298,794 | 11/1981 | Snitzer et al. | 374/161 |
| 4,420,251 | 12/1983 | James et al. | 356/32 |
| 4,653,906 | 3/1987 | Dunphy et al. | 356/32 |

FOREIGN PATENT DOCUMENTS 8601286  2/1986  PCT Int'l Appl. ................. 356/32

*Primary Examiner*—Richard A. Rosenberger
*Attorney, Agent, or Firm*—Brooks Haidt Haffner & Delahunty

[57] ABSTRACT

An optical fibre sensor 11 has two monomode cores 13,14 arranged in a common cladding 15 to allow cross-talk of optical signals between the cores as a function of strain, temperature and optical wavelength. Optical signals are generated by a generator 16 at two wavelengths, at one of which cross-talk between the cores 13,14 is temperature independent. The generated optical signals are injected into the element 11 via an optical fibre lead 18 having a single monomode core 19 which is connected to one of the cores 13 of the element 11 at one end thereof and after cross-talk between the cores, optical signals are extracted from the element, for example via the same lead 18, and processed to determine temperature and strain at the element.

13 Claims, 1 Drawing Sheet

SENSING STRAIN AND TEMPERATURE

This application is a continuation of application Ser. No. 07/061,734 filed June 11, 1987, now abandoned.

This invention relates to sensing strain and temperature.

It is known that when an optical fibre comprises two cores arranged in common cladding 'cross-talk' between the cores may occur by the light energy propagating in one core being transferred to the other core. Further it is known that the amount of cross-talk between the cores is a function of strain, temperature and wavelength, although by selection of materials, spacing and shape of the cores and cladding the cross-talk may be made independent of strain or temperature. For example U.S. Pat. No. 4,295,738 discloses how the cross-talk may be made independent of temperature such that by injecting light into one core and measuring the relative intensity of light emerging from the cores the strain over the length of a dual core fibre may be determined.

An object of the present invention is to utilise the above cross-talk phenomenon in order to sense both temperature and strain.

The invention includes a method of sensing strain and temperature comprising injecting optical signals at two wavelengths into an optical fibre sensor element having at least two monomode cores arranged in a common cladding to allow cross-talk of said optical signals between the cores as a function of strain, temperature and optical wavelength, one of said wavelengths being such that cross-talk between the cores is temperature independent, extracting optical signals from the element and processing the extracted signals to determine the temperature and strain of the element.

The invention also includes a strain and temperature sensing apparatus including an optical fibre sensor element having at least two monomode cores arranged in a common cladding to allow cross-talk of optical signals between the cores as a function of strain, temperature and optical wavelength, and means for generating optical signals at two wavelengths, at one of which cross-talk between the cores is temperature independent, means for injecting said generated optical signals into said element and for extracting optical signals therefrom, and processing means for determining the temperature and strain at the element from said extracted optical signals.

In two embodiments of the invention described hereinafter, said means for injecting said generated optical signals into said element and for extracting optical signals therefrom comprises an optical fibre having a single monomode core which is connected to one of the cores of the element at one end thereof.

In one of these embodiments, a further said optical fibre sensor element is serially connected to said first-mentioned element by a further said optical fibre, the core of which connects the said one core of the first-mentioned element to one of the cores of said further element. However, it is to be understood that this embodiment may be modified to comprise a plurality of further said optical fibre sensor elements serially connected to said first-mentioned element by respective further said optical fibres, the cores of which connect the said one core of the first-mentioned element to one of the cores in each of said further elements.

Preferably, in this embodiment said generating means, which may comprise two laser sources, are arranged to generate optical pulses. This enables the extracted signals to be identified by time with particular sensor elements.

In the second of the above-mentioned embodiments, reflecting means are provided at the other end of said sensor element for reflecting optical signals back through said one core thereof into the core of said optical fibre.

In a third embodiment of the invention, said means for injecting said generated optical signals into said element and for extracting optical signals therefrom comprises two optical fibres each having a single monomode core, one of said fibres being connected to one end of the element for injecting said generated optical signals into said element, and the other of said fibers being connected to the other end of the element for extracting optical signals therefrom.

Preferably in this embodiment one of the cores of said element is connected to the cores of both optical fibres.

In the second and third embodiments, said generating means may comprise two laser sources, L.E.D's or filtered white light sources and may additionally comprise means for modulating the optical signals generated thereby.

DETAILED DESCRIPTION OF THE INVENTION

In order that the invention may be well understood, the above-mentioned three embodiments thereof, which are given by way of example only, will now be described in more detail with reference to the accompanying drawings in which the three figures schematically show respective strain and temperature sensing apparatus.

Figure 1:
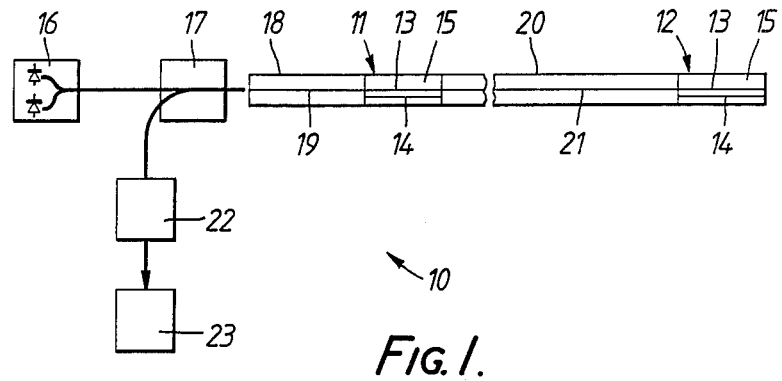
FIG. 1 shows an embodiment with two sensor elements.

In FIG. 1, there is shown a strain and temperature sensing apparatus 10 which comprises two optical fibre sensor elements 11 and 12. Each sensor element comprises two monomode cores 13 and 14 arranged in a common cladding 15 to allow cross-talk of optical signals between the cores as a function of strain, temperature and optical wavelength.

A device 16 for generating optical signals at two wavelengths and including two laser sources is arranged to generate optical pulses which are fed via a fibre coupler or beam splitter 17 to an optical fibre lead 18 having a single monomode core 19 which is connected to one of the cores (shown as 13) of the element 11 at one end thereof. The element 12 is serially connected to the element 11 by a further optical fibre lead 20 having a single monomode core 21 which connects the core 13 of the element 11 to one of the cores (shown as 13) of the element 12. When the optical signals generated by the generating device 16 are injected into the core 13 of the element 11 via the lead 18, cross-talk between the cores 13 and 14 of the element 11 will occur and a back scattered signal will be extracted from the core 13 by the lead 18. This back scattered signal is directed by the fibre coupler or beam splitter 17 to a detector 22 and a processor 23. The back scattered signal detected and processed is dependent upon the amount of cross-talk between the cores 13 and 14 of the element 11. At one of the two wavelengths of the optical signals, cross-talk between the cores is temperature independent. Accordingly, the extracted signals at the two wavelengths can be used to determine temperature and strain at the element 11 by the processor 23.

As will be appreciated, the optical signals injected into the element 11 after passing through that element are transmitted via the lead 20 to the element 12 where crosstalk will occur between the cores 13 and 14 and a back scattered signal will be directed to the detector 22 and processor 23 as before. As will be appreciated the detected signals are identifiable with the particular sensor element 11 or 12 from which they are extracted by the transit time of the pulsed signals.

Whilst the apparatus in FIG. 1 is illustrated as comprising only two sensor elements, it will be appreciated that further sensor elements of like construction can be serially connected with the illustrated elements 11 and 12 via respective optical fibre leads, the single monomode cores of which preferably connect the core 13 of the element 12 (and thus the core 13 of element 11) to one of the cores in each of the further sensor elements.

Figure 2:
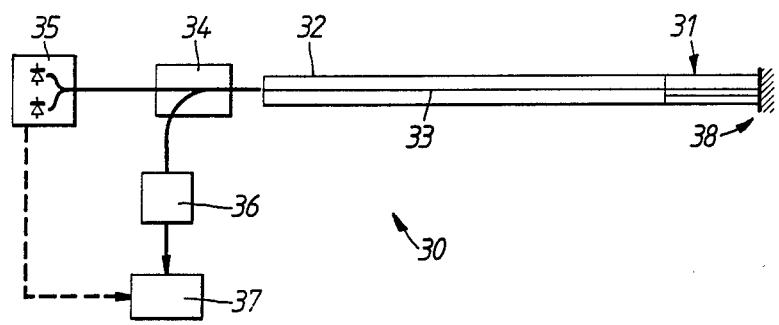
FIG. 2 shows an embodiment with a single sensor element.

The strain and temperature sensing apparatus 30 illustrated in FIG. 2 comprises a single sensor element 31 of like construction to the elements 11 and 12 of apparatus 10. Like the element 11 in apparatus 10, the element 31 is connected via an optical fibre lead 32 having a single monomode core 33 and a fibre coupler or beam splitter 34 to a generating device 35 which generates optical signals at two wavelengths, at one of which cross-talk between the cores of the element 31 is temperature independent.

In the apparatus 30, the end of the sensor element opposite the end thereof connected to the lead 32 is provided with reflecting means 38 for reflecting optical signals back through the core of the element connected to the single core of the lead 32 and thence via the fibre coupler or beam splitter 34 to a detector 36 and processor 37. The reflecting means may be a mirror chemically grown onto the end face of the element or a mirror surface butted to that end face.

As will be appreciated the optical signal which is extracted from the sensor element by reflection is dependent upon the amount of cross-talk which occurs between the cores of the element 31. Accordingly, as in the apparatus 10, the processor 37 is able to determine the temperature and strain at the element 31 from the extracted optical signals.

To improve the signal to noise ratio of the apparatus, the generating device 35 comprises means for modulating the optical signals generated thereby and the processor 37 includes a lock-in amplifier or a tuned amplifier.

In this apparatus the generating device 35 may comprise two laser sources or alternatively two L.E.D's or two filtered white light sources.

The above two apparatus may be described as being 'single-ended', since the injected and extracted optical signals travel along the same optical fibre leads.

Figure 3:
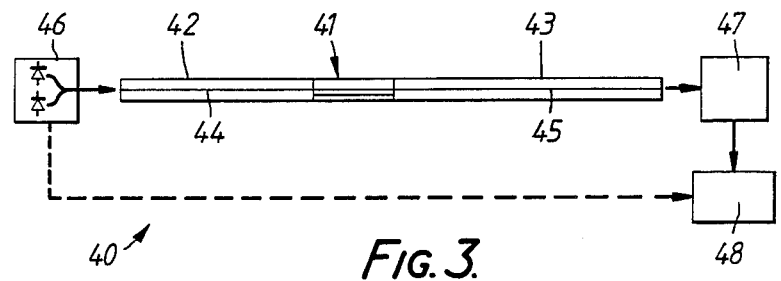
FIG. 3 shows a "double ended" embodiment.

In FIG. 3, there is illustrated an example of a strain and temperature sensing apparatus (designated 40) which may be described as 'double-ended' since it comprises an optical fibre sensor element 41 (whose construction is the same as elements 11 and 12) having respective optical fibre leads 42 and 43 connected to the two ends thereof. Each of the optical fibre leads 42 and 43 has a single monomode core 44 and 45 which are connected to one of the cores of the sensor element 41. As illustrated, a generating means 46 constructed as the generating device 35 of apparatus 30 generates optical signals at two wavelengths, at one of which cross-talk between the cores of the element 41 is temperature independent, and these optical signals are injected into the element 41 via the lead 42. Lead 43 extracts optical signals from the element 41 and the extracted signals are passed to a detector 47 and processor 48 which determines the temperature and strain at the element 41.

It is to be understood that whilst the illustrated sensor elements comprise two cores these elements could comprise more than two cores in a common cladding.

It will also be appreciated that in the apparatus disclosed, optical signals are extracted from the core of the element into which the signals are injected and it is not necessary to extract signals from the other core of the element. This is advantageous in that it allows conventional single core optical fibre leads to be used for injecting and extracting optical signals.

Advantageously, in order to assist connection between the cores of the optical fibre leads and the sensor elements, one core of the sensor element is positioned on the longitudinal axis of the element.

It is to be understood that the strain measured with the sensing apparatus may arise from longitudinal, transverse or radial stresses (or any combination thereof) in the element. In this connection it will be appreciated that radial stresses arise for example when the element is subjected to hydrostatic pressure.

We have also discovered that the sensitivity of the apparatus can be enhanced by using a polarized light source (or sources) the optical fibres, particularly for the leads 18,20;32;42,43, being chosen for their polarization maintaining characteristics. Polarized light may be used in each of the above described embodiments.

We claim:

1. A strain and temperature sensing apparatus including: an optical fiber sensor element having at least two monomode cores arranged in a common cladding to allow cross-talk of optical signals between said cores as a function of strain, temperature and optical wavelength; means for generating two optical signals at two different wavelengths, the cross-talk between said cores at one of said wavelengths being temperature independent and the cross-talk between said cores at the other of said wavelengths being both temperature and strain dependent, and each signal being substantially of a single wavelength; means for combining said generated optical signals and injecting both said signals into said element; means for extracting optical signals from said element; and processing means for comparing the optical signals which are temperature independent with the signals which are temperature and strain dependent and thereby separately determining both the temperature and strain at the element from said extracted signals.

2. Apparatus as claimed in claim 1, wherein said means for combining and injecting said generated optical signals into said element and for extracting optical signals therefrom comprises an optical fiber having a single monomode core which is connected at one end to said means for generating two optical signals and connected at its opposite end to one of said cores of said element at one end of the latter.

3. Apparatus as claimed in claim 2, comprising a further said optical fiber sensor element serially connected to said first-mentioned element by a further said optical fiber having a core connecting the said one core of the first-mentioned element to one of the said cores of said further element.

4. Apparatus as claimed in claim 2, comprising a plurality of further said optical fiber sensor elements serially connected to said first-mentioned element by respective further said optical fibers, the cores of said further said optical fibers connecting the said one core of the first-mentioned said element to one of the said cores in each of said further elements.

5. Apparatus as claimed in claim 1, wherein said generating means is pulse modulated.

6. Apparatus as claimed in claim 1, wherein said generating means comprises two laser sources, one of said sources generating signals at one of said wavelengths at substantially the same time that the other of said sources generates signals at the other of said wavelengths.

7. Apparatus as claimed in claim 1, comprising reflecting means provided at the end of said sensor element opposite to the end thereof connected to said optical fiber having a single monomode core for reflecting optical signals back through said one core thereof into said core of said optical fiber.

8. Apparatus as claimed in claim 7, wherein said generating means is selected from the group consisting of two laser sources, two L.E.D.'s and two filtered white light sources.

9. Apparatus as claimed in claim 7, wherein said generating means comprises means for modulating the optical signals generated thereby.

10. Apparatus as claimed in claim 1, wherein said means for combining and injecting said generated optical signals into said element and said means for extracting optical signals therefrom comprises two optical fibers each having a single monomode core, one of said fibers being connected between said generating means and one end of the element for injecting said generated optical signals into said element, and the other of said fibers being connected to the other end of said element for extracting said optical signals therefrom.

11. Apparatus as claimed in claim 10, wherein one of the said cores of said element is connected at said one end thereof to the said core of said one of said one of said optical fibers and is connected at said other end thereof to said core of said other of said optical fibers.

12. Apparatus as claimed in claim 1, wherein said generating means comprises a source of polarized light, and said means for combining and injecting said signals and said means for extracting optical signals are polarization maintaining optical fibers.

13. A method of sensing strain and temperature comprising at least substantially simultaneously injecting two optical signals at two different wavelengths into an optical fiber sensor element having at least two monomode cores arranged in a common cladding to allow cross-talk of said optical signals between the cores as a function of strain, temperature and optical wavelength, each of said signals being substantially of a single wavelength and one of said wavelengths being such that cross-talk between the cores is temperature independent and the other of said wavelengths being such that cross-talk between said cores is both temperature and strain dependent; extracting optical signals from the element; and processing the extracted signals by comparing the signals which are temperature independent with the signals which are temperature and strain dependent to determine separately both the temperature and strain at said element.

* * * * *